Feb. 21, 1961 E. T. YOUNG 2,972,193
BORE-HOLE CLINOMETER
Filed Nov. 7, 1958 2 Sheets-Sheet 1

INVENTOR.
EINAR T. YOUNG
BY Robert O. Spindle
ATTORNEY

Feb. 21, 1961　　　E. T. YOUNG　　　2,972,193
BORE-HOLE CLINOMETER

Filed Nov. 7, 1958　　　　　　　2 Sheets-Sheet 2

INVENTOR.
EINAR T. YOUNG
BY Robert O. Spindle
ATTORNEY

United States Patent Office 2,972,193
Patented Feb. 21, 1961

2,972,193
BORE-HOLE CLINOMETER
Einar T. Young, Newtown Square, Pa., assignor to Sun Oil Company, Philadelphia, Pa., a corporation of New Jersey
Filed Nov. 7, 1958, Ser. No. 772,526
6 Claims. (Cl. 33—205)

This invention relates to a clinometer, and more particularly to a clinometer which may be used to determine the inclination and direction of the bottom of holes being drilled or bored in the ground for oil or other minerals.

At the present time, particularly in the search for oil, holes are being drilled deeper and deeper. These deeper holes have rather high bottom-hole temperatures. There are now in use a number of clinometers for determining the bottom-hole inclination and direction, in bore holes. However, all of them known to me use one or more elements or components which are rendered ineffective if not inoperative by high temperatures, examples of these elements being photographic paper or film, batteries, clocks, liquid, and pivots or other bearings. The clinometer of the present invention uses no such elements.

An object of this invention is to provide a bore-hole clinometer which is unaffected by high temperatures, and which may therefore be termed a hot-hole clinometer.

Another object is to provide a novel clinometer for use in bore holes.

A further object is to provide a novel clinometer which can be used for measuring in bore holes of any angle, even in bore holes which are reentrant or turn upward.

The objects of this invention are accomplished, briefly, in the following manner: Inside a housing which is adapted to be dropped down a bore hole, a spherical indicating member is suspended on air bearings, so that it is free to rotate in any direction relative to the housing. This member is provided with means which maintain the same upright, and also oriented in a particular direction, irrespective of the inclination and orientation of the housing. A high pressure air chamber in the housing functions as a rervervoir, to provide air for the air bearings, and also functions in conjunction with a clamping member and a low pressure air chamber, to clamp the indicating member against a seat in the housing (thereby preventing further rotary movement of this member), this clamping action taking place a predetermined time after the housing is dropped down the hole. This clamping is made to take place at or after the time when the housing reaches the bottom of the hole. The housing is then brought to the surface, where the clamped position of the indicating member is examined or photographed. By providing suitable indicia on the spherical surface of the indicating member, together with a fiducial mark on the housing, the inclination and direction of the bottom of the bore hole may be readily determined.

A detailed description of the invention follows, taken in conjunction with the accompanying drawings, wherein.

Figure 2:
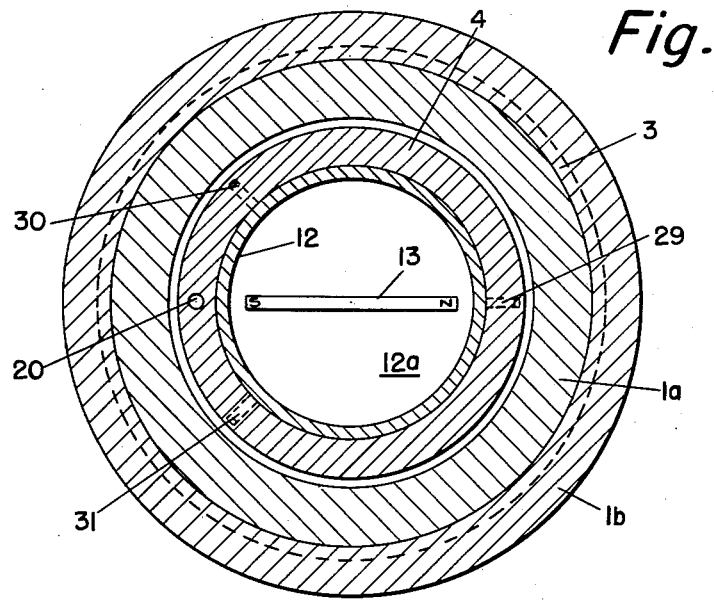
Figure 2 is a transverse cross-section taken on the line 2—2 in Figure 1, looking in the direction of the arrows.
Figure 3:
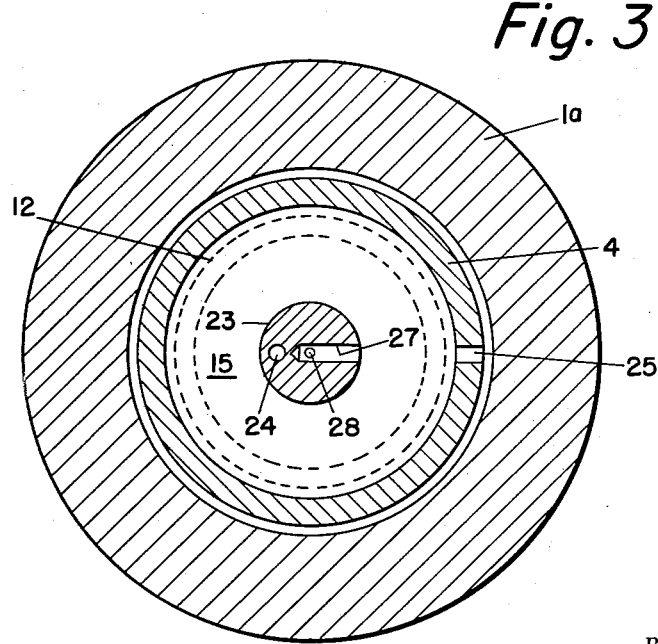
Figure 3 is a transverse cross-section taken on the line 3—3 in Figure 1, looking in the direction of the arrows.

Referring now to the drawings, a housing 1, made of any suitable non-magnetic material such as aluminum or brass, is adapted to be dropped down a bore hole. This housing is streamlined by being pointed at its lower end, to facilitate its passage down the hole. In order to enable the instrument housing to be withdrawn from the hole, it is provided with a catch or fishing neck 2 at its upper end. By hooking a wire line onto this catch, the housing may be retrieved or withdrawn from the bore hole, when desired. The housing 1 is generally cylindrical in cross-section, as shown in Figures 2 and 3, and comprises an upper housing section 1a and a lower housing section 1b, detachably secured together at 3, as by means of threads. This threaded coupling permits the lower section 1b to be separated from the upper section 1a, for a purpose which will hereinafter appear.

A body 4, which contains the active portion of the clinometer, is mounted in housing 1. Body 4, which is also generally cylindrical in cross-section, is made of any suitable non-magnetic material and is held in position by means of an outwardly-extending peripheral annular flange 4a near the lower end of body 4, which flange fits into a recess provided between a shoulder on housing section 1b and the juxtaposed lower end of housing section 1a, an O-ring 5 being inserted between flange 4a and the lower end of housing section 1a. The threading of lower section 1b onto upper section 1a causes O-ring 5 to be compressed between flange 4a and housing section 1a, thus dividing the space inside housing 1 into an upper chamber 6 and a lower chamber 7. The unthreading and removal of lower section 1b from upper section 1a permits access to body 4, or the removal of this body from upper section 1a if necessary. Except for the outwardly-extending flange 4a, the outer diameter of body 4 is less than the inner diameter of housing 1, thus leaving an annular space between the outside of body 4 and the inner cylindrical wall of upper housing section 1a. This annular space is in direct communication with upper chamber 6, and performs a necessary function, as will become apparent hereinafter.

A glass disk 8, held in place by means of a ring 9 threaded into the lower end of body 4, seals off the lower end of this hollow body. A reticle 10, in the form of a pair of crossed lines, is engraved on the upper surface of disk 8. These lines intersect at the exact center of the disk (and also on the longitudinal axis of body 4) to provide a fiducial point thereat. The reason for this reticle and fiducial point will be explained hereinafter.

Figure 1:
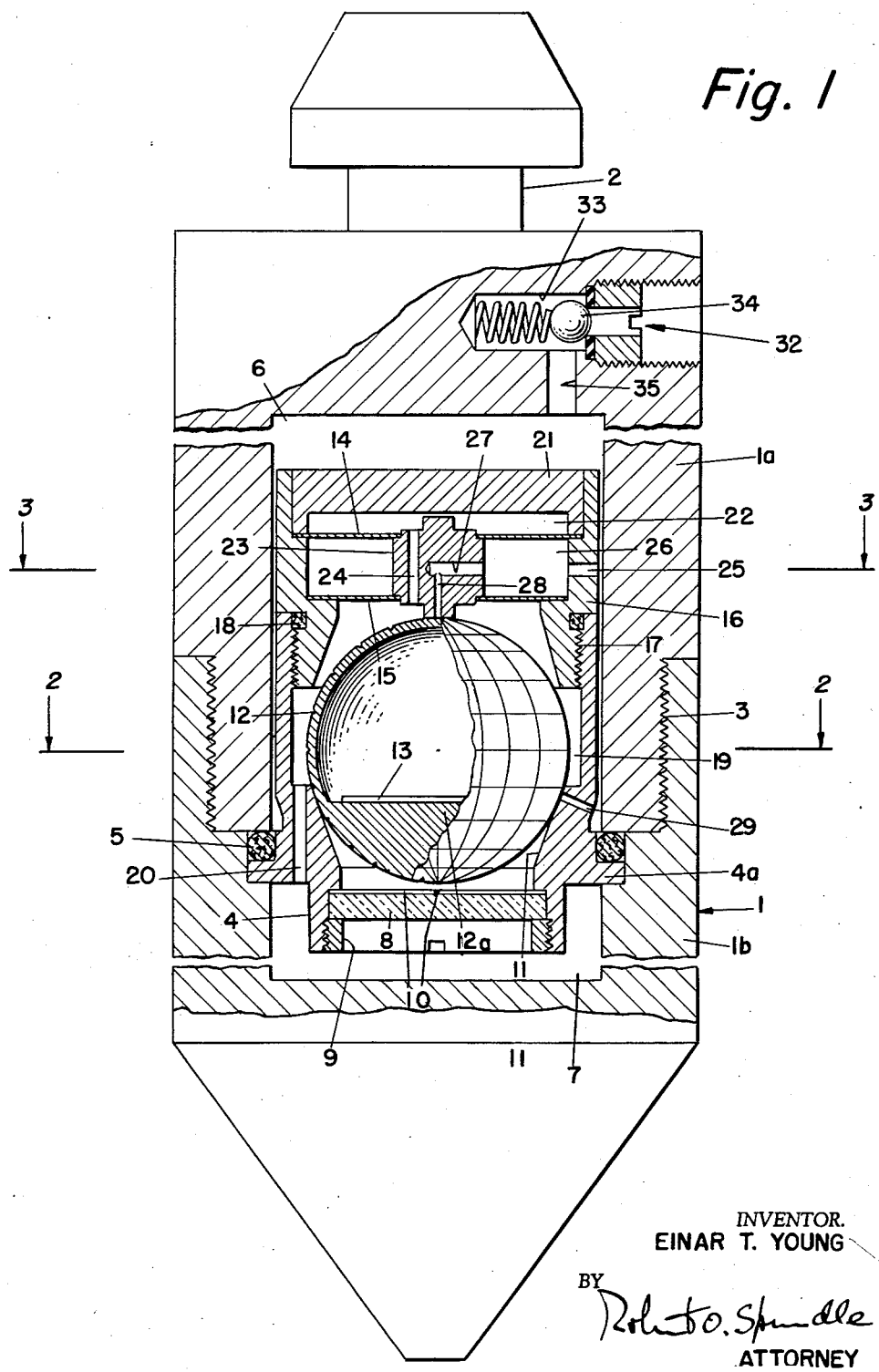
Figure 1 is a longitudinal cross-section through a clinometer according to this invention, the spherical indicating member being shown in its clamped position.

Just above disk 8, inside body 4, there is provided a frusto-conical seat 11, which is integral with this body, and which has its small diameter pointing downwardly. A spherical indicating member 12 is positioned inside body 4, this sphere being adapted to rest on seat 11 when the member 12 is in its clamped position illustrated in Figure 1, but being adapted to "float on air" thereabove at certain times, as will be explained hereinafter. When the sphere is thus "floating," it is free to rotate in any direction relative to housing 1 and body 4. The spherical member 12 is made of any suitable non-magnetic material and is mostly hollow, but has an integral weighted portion 12a at one side thereof which is sufficient to keep the spherical member upright (with this weighted portion at the bottom) irrespective of the inclination of the housing 1 and of the body 4 secured therein, provided member 12 is then floating or unclamped, and is free to rotate. A compass needle 13 is secured inside sphere 12, preferably being secured to the upper flat surface of the weighted portion 12a, so that such needle will be maintained horizontal when the sphere 12 is floating or unclamped. Compass needle 13 maintains the sphere oriented in a particular direction (i.e., oriented with magnetic north) irrespective of the orientation of the housing 1 and of body 4, provided of course that member 12 (and thus also needle 13) is then unclamped, and free to rotate.

A pair of parallel, spaced diaphragms 14 and 15 are brazed at their edges each to a respective shoulder provided in a ring member 16. The lower shoulder, to which the lower diaphragm 15 is brazed, extends radially inwardly (from the outer wall of ring 16) considerably more than does the upper shoulder, to which the upper diaphragm 14 is brazed. Therefore, the upper diaphragm 14 has considerably more effective area than does the lower diaphragm 15. The lower end of ring member 16 is threadedly secured, as at 17, to the upper end of body 4, and O-ring 18 being provided to seal this threaded joint.

The lower diaphragm 15 seals off the space above the sphere 12, to provide a chamber 19 surrounding sphere 12, but above its seat 11. Chamber 19 communicates with the lower (low pressure) chamber 7 by means of a longitudinal bore or passage 20 extending parallel to the outer wall of body 4, just outside the seat 11.

A cap mmeber 21 is sealed into the upper end of ring member 16, at a point somewhat above the upper diaphragm 14, to provide a closed chamber 22 above this diaphragm. Chamber 22 is sealed off from the upper (high pressure) chamber 6 by means of cap 21.

A clamping member or shoe 23 is mounted in the central portion of the two diaphragms 14 and 15. The shape of member 23, and the shapes of diaphragms 14 and 15, are such as to hold member 23 lightly against the surface of the sphere 12, and thus to hold or clamp the sphere down against its seat 11. A longitudinal bore or passage 24 extends entirely through the member 23, to place chamber 22 in communication with chamber 19.

A radial or transverse aperture 25 is provided through the wall of ring member 16, in order to place the chamber 26 between diaphragms 14 and 15 in communication with the annular space surrounding body 4, and thus in communication with the high pressure chamber 6. In order to provide an air bearing or air suspension at the top of sphere 12, a passage 27 extends transversely or radially only partially through member 23, from chamber 26 to a point adjacent to the longitudinal axis of body 4. From the inner end of passage 27, a restricted or small diameter passage 28 extends axially to the lower end of member 23 and chamber 19, so that air supplied to chamber 26 from chamber 6 (by way of passage 25) can flow through passages 27 and 28 and impinge on sphere 12. In this way, an air bearing or air suspension may be provided between member 23 and the upper surface of sphere 12.

In order to provide air bearings or air suspensions at the bottom of sphere 12, three spaced orifices 29, 30, and 31 are provided in seat 11, these orifices being spaced at points substantially 120° apart about the circumference of seat 11 and the axes of these orifices extending substantially perpendicularly to the face of seat 11. These latter orifices are of restricted diameter and extend transversely from the annular space surrounding body 4 to the chamber 19, so that air can flow from chamber 6 through orifices 29, 30, and 31 and impinge on sphere 12. In this way, air bearings or air suspensions may be provided between seat 11 and the lower surface of sphere 12.

In connection with the air bearings at the upper and lower sides of the sphere, it is desired to again be pointed out that the annular space surrounding body 4 is in effect a portion of the high pressure chamber 6. In connection with diaphragms 14 and 15, it is noted that chambers 22, 26, and 19 are all sealed from each other, except as previously noted.

A check valve 32 is provided at the upper end of chamber 6, this valve being constructed and arranged to allow air to be pumped from a point outside the housing 1 into chamber 6. This check valve includes a radial passage 33 closed by a spring-loaded ball 34, a longitudinal passage 35 providing communication between passage 33 and the upper end of chamber 6.

To activate the instrument described, air is pumped through check valve 32 into the high pressure chamber 6, to a predetermined pressure. This pressure causes air to flow into chamber 26, by way of passage 25. Low pressure chamber 7 (originally at atmospheric pressure, when housing section 1b is screwed onto housing section 1a) communicates by passages 20 and 24 with chambers 19 and 22, and these latter chambers are therefore all at atmospheric pressure at the start.

The high pressure in chamber 26 tends to urge diaphragm 14 upward and diaphragm 15 downward. Since diaphragm 14 has more total effective area than diaphragm 15, the net movement will be upward, lifting clamping member 23 free of the sphere and against the upper stop provided by the lower surface of cap member 21. Air will now be forced through the orifice 28 and the three orifices 29, 30, and 31, lifting the sphere 12 off its conical seat 11 and yet, because of the air flowing through orifice 28, keeping it from bumping against clamping member 23. The sphere 12 is thus completely "floating on air" or is suspended on air bearings, and is free to rotate in any direction relative to housing 1 or body 4.

It may be seen that any air flowing from the high pressure chambers 6 and 26 to the low pressure chambers 22, 19, and 7 must flow through the restricted passages 28, 29, 30, and 31, so that the high pressure and low pressure chambers are in communication only by way of such restricted passages. Thus, after the air pressure has been built up in the high pressure air chamber or reservoir 6, a considerable time must elapse before the pressures in the various chambers equalize.

After sufficient air has been pumped into chamber 6 to provide a predetermined pressure therein, the housing 1 (together with the various elements contained or mounted therein) is dropped into the bore hole, so that it can proceed down the same to the bottom thereof. Sufficient air pressure is supplied in chamber 6 (considering the restricted communication between this high pressure chamber and the various low pressure chambers) to last long enough for the instrument to reach the bottom. Since the indicating member or sphere 12 is originally mounted or suspended on air bearings and is thus arranged for free rotary movement in any direction relative to the housing 1 and body 4, and since the compass needle 13 and weighted bottom 12a maintain the sphere upright and oriented in a particular direction, irrespective of the inclination and orientation of the housing 1, the position assumed by the sphere 12, when the instrument is at the bottom of the bore hole, is indicative of the inclination and direction of the hole bottom. By clamping the sphere in position after reaching the bottom of the hole, and examining or photographing the same after it is brought to the surface, the inclination and direction of the bottom of the bore hole may be determined.

Of course, the pressures in the various chambers will eventually equalize, since such chambers do communicate with each other, although this equalization will proceed rather slowly because of the restricted nature of the intercommunicating passages, as previously described. As the pressures in the various chambers begin to equalize, the net upward force exerted by diaphragms 14 and 15 on clamping member 23 will decrease, so that this member will move downward and approach the sphere 12.

As the member 23 approaches the indicating member 12, the accuracy of centering of the spherical outer surface of member 12 in its conical seat 11 becomes greater, until finally the clamping member 23 makes contact with the member 12 and clamps the same in position. Thus, the sphere is clamped in the position assumed thereby at the bottom of the bore hole. In this connection, it is desired to be pointed out that the diaphragms 14 and 15 are so constructed and arranged as to hold clamping member 23 lightly against indicating member 12 in the absence of any appreciable pressure in chamber 26, thus clamping sphere 12 against seat 11.

After the lapse of a suitable time following the dropping of the instrument down the bore hole, the same is withdrawn by hooking a wire line onto the catch or fishing neck 2 at the top of housing section 1a. Then, the lower housing section 1b is unscrewed from the upper housing section 1a, and the inner body 4 is carefully removed from the housing 1.

The indicating member 12 preferably has suitable markings or indicia covering its entire spherical outer surface. As previously stated, glass disk 8 has a reticle 10 thereon comprising a pair of crossed lines which cross exactly on the common longitudinal axis of housing 1 and body 4, that is, in the exact center of disk 8, to thereby provide a fiducial point. A reading glass or camera is now applied to the lower end of body 4, and the inclination and direction of the bottom of the bore hole then can be read or recorded (through the transparent glass disk 8) from the relationship of the fixed fiducial point 20 to the indicia on the surface of the sphere 12. Any angle of bore hole, including those of reentrant form or turning upward, can be measured by providing indicia over the entire outer surface of sphere 12.

By initially (that is, before the instrument housing is dropped down the bore hole) pressurizing chamber 6 to the proper point, the air will act as a clock and clamp the sphere 12 at any predetermined time thereafter.

In order for the clinometer of this invention to operate properly to indicate the direction of the bore hole bottom, it is essential that there be no magnetic material surrounding or in the immediate vicinity of the compass needle 13. Therefore, housing 1, body 4, and spherical indicating member 12 are all made of non-magnetic material. If the drill stem and drill bit used for the bore hole are made of magnetic material, the drill stem and bit should be raised above the bottom of the hole, and the clinometer of this invention dropped down below the bit through a hole provided therein. Of, if a non-magnetic drill collar is utilized, the clinometer housing need be dropped down only to the vicinity of such collar.

It is pointed out that the clinometer of this invention utilizes no elements or components which are rendered ineffective or inoperative by high temperatures, so that it is particularly useful in deep bore holes, which have high bottom-hole temperatures.

The invention claimed is:

1. A bore-hole clinometer comprising a housing adapted to be dropped down a bore hole, a seat in said housing, an indicating member positioned in said housing and adapted to rest on said seat, a high pressure air chamber in said housing, a low pressure air chamber in said housing, said high pressure chamber and said low pressure chamber being in communication only by way of restricted passages including passages extending through said seat and so arranged as to cause air flowing therethrough to impinge on said member, thereby lifting the latter off said seat so that such member is free to rotate in any direction relative to said housing; means operatively associated with said member for maintaining the same upright and oriented in a particular direction irrespective of the inclination and orientation of said housing, a movable clamping member in said housing adapted when in clamping position to clamp said first-named member against further movement in the housing, and means for moving said clamping member to a clamping position only in response to a substantial equalization of the pressures in said chambers.

2. Apparatus as defined in claim 1, wherein the housing and indicating member are provided with cooperating indicia for indicating the total amount and sense of rotary movement of said indicating member relative to said housing, prior to the clamping of such member.

3. Apparatus as defined in claim 1, wherein the indicating member is a spherical member provided with indicia over its entire outer surface.

4. A bore-hole clinometer comprising a housing adapted to be dropped down a bore hole, a seat in said housing, an indicating member positioned in said housing and adapted to rest on said seat, a high pressure air chamber in said housing, a low pressure air chamber in said housing, said high pressure chamber and said low pressure chamber being in communication only by way of restricted passages including passages extending through said seat and so arranged as to cause air flowing therethrough to impinge on said member, thereby lifting the latter off said seat so that such member is free to rotate in any direction relative to said housing; means operatively associated with said member for maintaining the same upright and oriented in a particular direction irrespective of the inclination and orientation of said housing, a movable clamping member in said housing adapted when in clamping position to clamp said first-named member against further movement in the housing, and means for moving said clamping member to a non-clamping position in response to a substantial difference in the pressures in said chambers and for moving said clamping member to a clamping position in response to a substantial equalization of the pressures in said chambers.

5. A bore-hole clinometer comprising a housing adapted to be dropped down a bore hole, a conical seat in said housing, a spherical member positioned in said housing and adapted to rest on said seat, said member having indicia over its entire outer surface and said housing having a cooperating index thereon, a high pressure air chamber in said housing, a low pressure air chamber in said housing, said high pressure chamber and said low pressure chamber being in communication only by way of restricted passages including passages extending through said seat and so arranged as to cause air flowing therethrough to impinge on said member, thereby lifting the latter off said seat so that such member is free to rotate in any direction relative to said housing; means operatively associated with said member for maintaining the same upright and oriented in a particular direction irrespective of the inclination and orientation of said housing, a movable clamping member in said housing adapted when in clamping position to clamp said first-named member against further movement in the housing, and means for moving said clamping member to a clamping position only in response to a substantial equalization of the pressures in said chambers.

6. A bore-hole clinometer comprising a housing adapted to be dropped down a bore hole, a conical seat in said housing, a spherical member positioned in said housing and adapted to rest on said seat, said member having indicia over its entire outer surface and said housing having a cooperating index thereon, a high pressure air chamber in said housing, a low pressure air chamber in said housing, said high pressure chamber and said low pressure chamber being in communication only by way of restricted passages including passages extending through said seat and so arranged as to cause air flowing therethrough to impinge on said member, thereby lifting the latter off said seat so that such member is free to rotate in any direction relative to said housing; means operatively associated with said member for maintaining the same upright and oriented in a particular direction irrespective of the inclination and orientation of said housing, a movable clamping member in said housing adapted when in clamping position to clamp said first-named member against further movement in the housing, and means for moving said clamping member to a non-clamping position in response to a substantial difference in the pressures in said chambers and for moving said clamping member to a clamping position in response to a substantial equalization of the pressures in said chambers.

References Cited in the file of this patent

UNITED STATES PATENTS

| | | |
|---|---|---|
| 845,875 | Lewis | Mar. 5, 1907 |
| 856,990 | Schweder | June 11, 1907 |
| 1,634,934 | Donaldson | July 5, 1927 |
| 1,987,696 | McLaughlin et al. | Jan. 15, 1935 |
| 2,086,897 | Carter et al. | July 13, 1937 |